United States Patent [19]
Bergetz

[11] Patent Number: 5,383,641
[45] Date of Patent: * Jan. 24, 1995

[54] TELEVISION SUPPORT MEMBER SECURITY MOUNTING ASSEMBLY

[75] Inventor: Carl A. Bergetz, River Forest, Ill.

[73] Assignee: Peerless Industries, Inc., Melrose Park, Ill.

[ * ] Notice: The portion of the term of this patent subsequent to May 11, 2010 has been disclaimed.

[21] Appl. No.: 967,160

[22] Filed: Oct. 27, 1992

[51] Int. Cl.$^6$ .............................................. A47F 7/00
[52] U.S. Cl. .................... 248/425; 248/551; 248/922; 248/349
[58] Field of Search ............... 248/425, 551, 922, 919, 248/349, 917, 918, 920, 921, 923, 924; 70/58

[56] References Cited

U.S. PATENT DOCUMENTS

| | | |
|---|---|---|
| 2,808,223 | 10/1957 | Abeles . |
| 3,358,957 | 12/1967 | Lindenmuth ..................... 248/920 |
| 3,724,798 | 4/1973 | Lucasey . |
| 3,908,942 | 9/1975 | Kieth et al. . |
| 3,936,026 | 2/1976 | Hampel et al. ..................... 248/922 |
| 4,579,311 | 4/1986 | Spranza, III . |
| 4,691,891 | 9/1987 | Dionnel . |
| 4,739,637 | 4/1988 | Finkel et al. . |
| 4,884,420 | 12/1989 | Finkel et al. . |
| 4,893,777 | 1/1990 | Gassaway ..................... 248/551 |
| 4,946,127 | 8/1990 | Kulaga . |
| 4,964,606 | 10/1990 | Beam et al. ..................... 248/919 |
| 5,209,445 | 5/1993 | Bergetz ..................... 248/551 |

Primary Examiner—Eugenia Jones
Assistant Examiner—Allan M. Schrock
Attorney, Agent, or Firm—Lockwood Alex FitzGibbon & Cummings

[57] ABSTRACT

A security mounting assembly for an electrical appliance, such as a color television set includes a mounting member which can be attached to a substantially flat support surface by a series of fasteners. The mounting member is rotatably connected to a support tray, which has an upwardly extending flange extending on a portion of the perimeter of the support tray. The television is held in place on the support member by a series of fasteners and is held in such a manner such that the television may not be readily removed from the support tray.

17 Claims, 2 Drawing Sheets

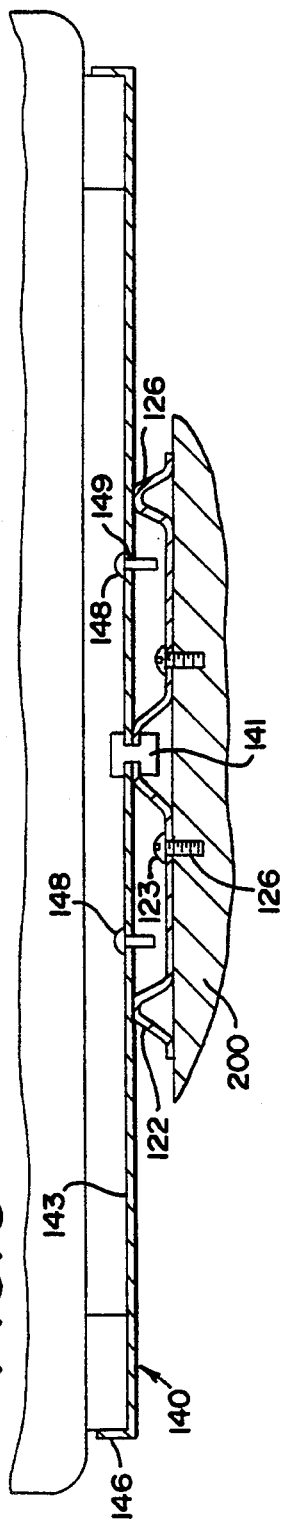
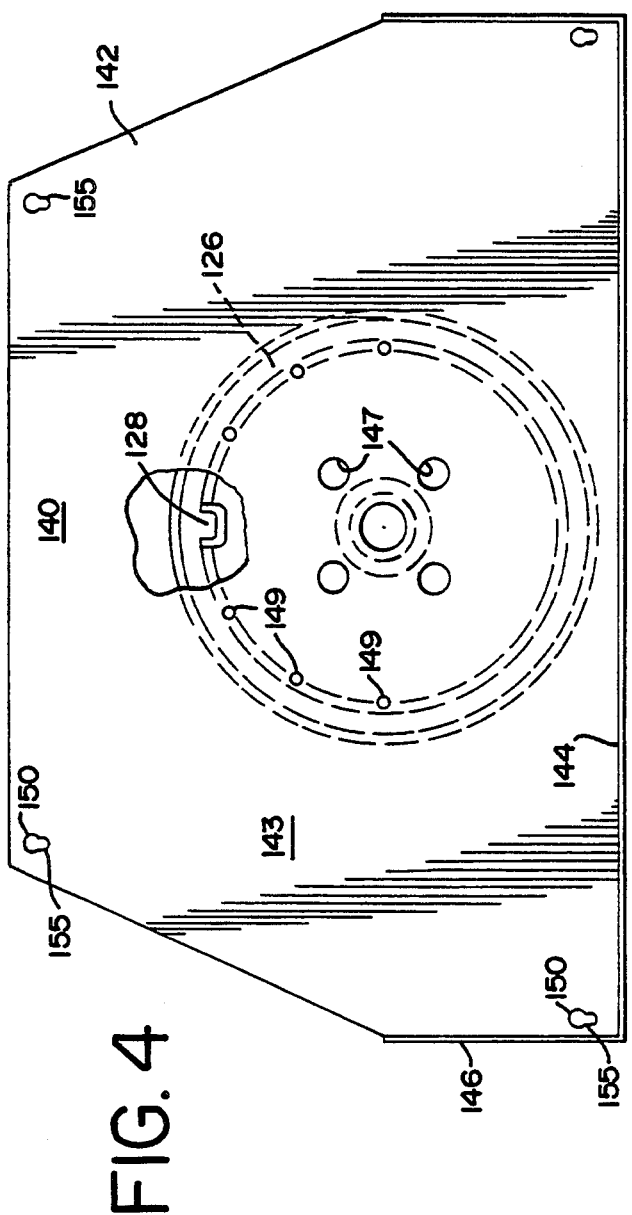

TELEVISION SUPPORT MEMBER SECURITY MOUNTING ASSEMBLY

BACKGROUND AND SUMMARY OF THE INVENTION

The present invention relates generally to mounting systems for electrical appliances, such as television receivers, and more particularly, to a mounting assembly for securely mounting such an appliance in a substantially non-removable manner to a support surface tray.

Color and stereo television receivers and monitors are a necessary appliance for hotel rooms, hospital rooms and public meeting rooms. Such appliances are tempting targets for burglars and thieves. The theft of television sets is a serious problem to hotel chains and the like. Other appliances, such as personal computers, video recorders and stereo equipment are also considered valuable targets of theft by their owners and thus, the need exists for apparatus to securely mount televisions within areas such as hotel rooms and to securely mount other appliances within a home or office. Numerous such assemblies exist in the art. Some security systems, such as that described in U.S. Pat. No. 4,268,099 issued May 19, 1991 utilize cables attached to the television or appliance which attach to a rack or the like. These cables are not a sufficient theft deterrent in that they can easily be cut with appropriate means such as a pair of cable cutters. Other security systems, such as that described in U.S. Pat. No. 4,738,428 involve the use of locking bars or straps. Such systems are unusually bulky and may be circumvented by the use of a crowbar.

The present invention provides an alternative to such security systems and permits the relatively inexpensive secure, substantially non-removable mounting of expensive electrical appliances such as television receivers and monitors on various flat mounting surfaces such as pedestals or furniture. The present invention also provides a mounting system for such in which a base member which is capable of swiveling is secured in place to a flat support surface and the appliance is substantially non-removeably attached to the base member. In accordance with the present invention, a generally planar upper element serves as a base member and a lower element in the form of a swivel member is permanently and rotatably attached to the base member to permit the appliance to be rotated in a predesired manner after securement to the mounting assembly. A series of first and second engagement means in the form of fastening members engage the appliance by extending through the base member and into the appliance. At least one pair of the fastening members, preferably the second set, are of a security-style or tamper-proof design and are angularly offset from the remaining fastening members. The fasteners prevent removal of the appliance from the base member.

The appliance, such as a television, is secured to the base member by means of a first set of fasteners which pass through the base member and into apertures disposed on the bottom of the television. These first fasteners engage the base member and maintain the appliance in a preselected orientation on the base member. A second set of fasteners engage the television cabinet by passing through a flange portion of the base member to hold it in place thereon and substantially restrict any movement thereof on the base member in a manner which would permit disengagement of the first set of fasteners and subsequent removal of the television from the base member. The second fasteners may protrude through one or more skirt flanges which project along some of the sides of the base member and which cooperate with the first fasteners to substantially prevent movement of the television upon the base member. The base member is rotatably attached to a mounting member which is secured to a support surface by a series of fasteners. Access to such mounting member fasteners is blocked by the appliance being fixed in place on the base member.

In this regard, it is an object of the present invention to provide a secure mounting means for substantially non-removably mounting an electrical appliance, such as a television receiver, to a flat surface wherein the mounting means includes a base member which engages the appliance in a manner such that any engagement fasteners are not easily accessible from the exterior of the support member.

It is another object of the present invention to provide a mounting assembly for securely mounting a television to a flat surface in which the exterior cabinet or housing portion of the television is positioned in an initial position on a planar base member, a series of retaining fasteners project through the base member to engage the television, and wherein the base member includes one or more flanges which extend along an edge of the base member to define the extent of the final position of the television upon the base member, the television being further secured to the base member by a second set of fasteners extending through the flange and into engagement with the television to securely hold the television in its final position on the base member.

It is still a further object of the present invention to provide an easily installed and relatively inexpensive security mounting system in which a substantially planar support tray includes means for engaging a television set and retaining the television set in place upon the support tray, the engagement means including in combination, a flange which defines an endwall of the support tray, and a series of apertures located on the support tray which receive a series of first fasteners that engage the television set the first fasteners being capable of installation into the television set and engaging the support tray of the installation, the first fasteners being subsequently moved into engagement with slots of the support tray, the television being held in place upon the support tray such that the first fasteners are maintained in a substantially non-accessible position by at least two second tamper-proof fasteners which extend through the support tray flanges to engage the television, the support tray having a lower swivel member rotatably connected to the support tray, the support tray permitting access to fastening hardware for the swivel member only when the television is not in place upon the support tray.

It is still another object of the present invention to provide a security mounting system for a television monitor or other similar electronic device in which the television monitor has an exterior housing, the system including a lower mounting portion adapted to be attached to a planar surface, an upper support portion rotatably interconnected to the lower portion, the upper portion including means for restricting the degree of rotation of the upper portion with respect to the lower portion, the upper portion including a tray member partially defined by a flange extending away from the tray member for a portion of the perimeter thereof, the tray member having a series of apertures disposed therein which are adapted to receive first engagement means extending from the television monitor and the flange having at least one aperture angularly offset from the first engagement means which is adapted to receive a second engagement means, whereby the second engagement means prevents lateral movement of the television with respect to the support tray and the first engagement means prevents vertical movement of the television with respect to the support tray.

These and other objects, features, advantages of the present invention will become readily apparent through a consideration of the following detailed description.

BRIEF DESCRIPTION OF THE DRAWINGS

During the course of the following detailed description, reference will be frequently made to the following drawings in which like reference numerals identify like parts:

FIG. 3 is a partial cross-sectional view of the base member and appliance cabinet interface; and FIG. 4 is a plan view, partially in section of the base member of the security mounting assembly of FIG. 1.

DETAILED DESCRIPTION OF THE INVENTION

Figure 1:
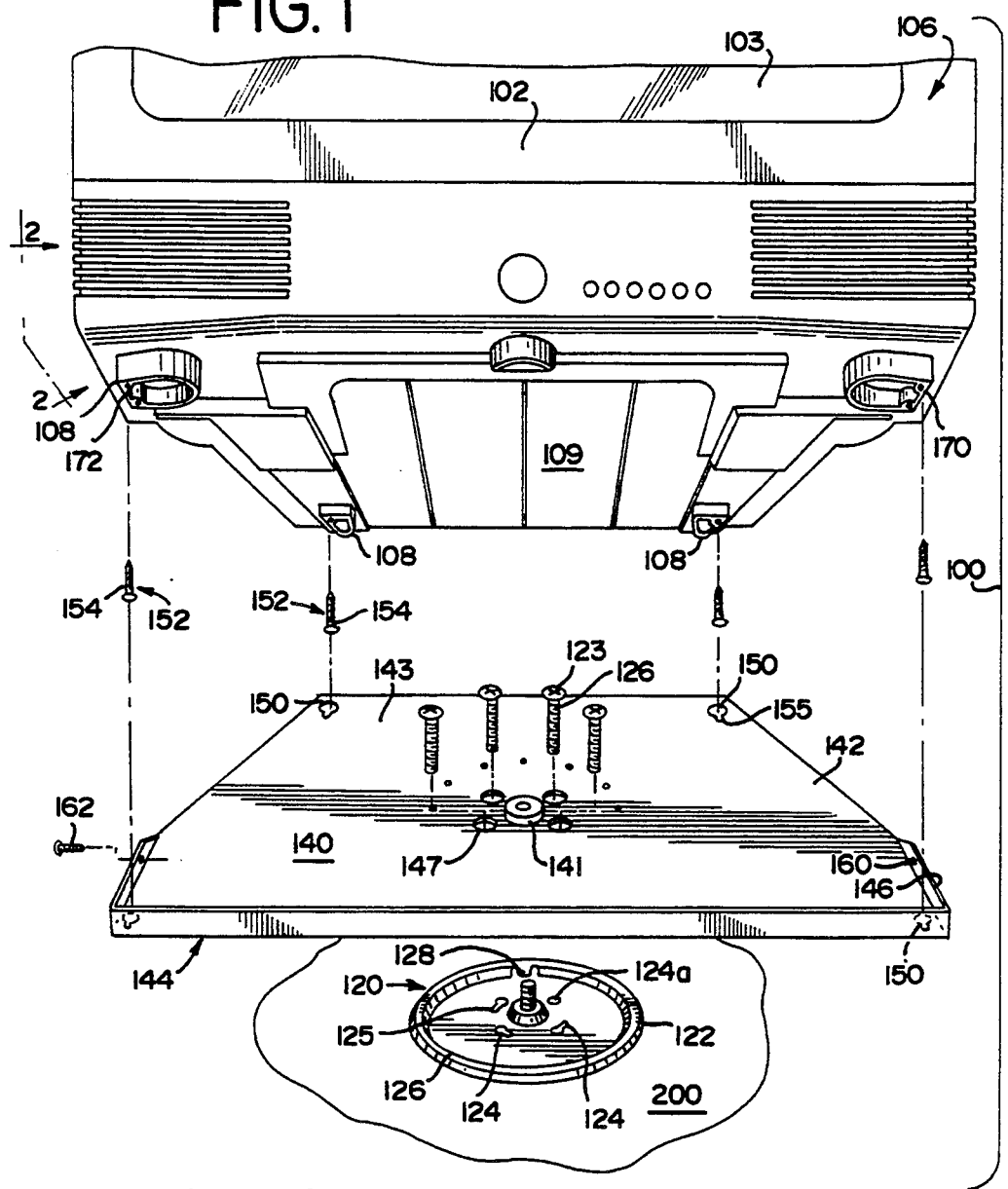
FIG. 1 is an exploded frontal view of a security appliance mounting assembly constructed in accordance with the principles of the present invention with a television receiver in position for mounting thereon.
Figure 2:
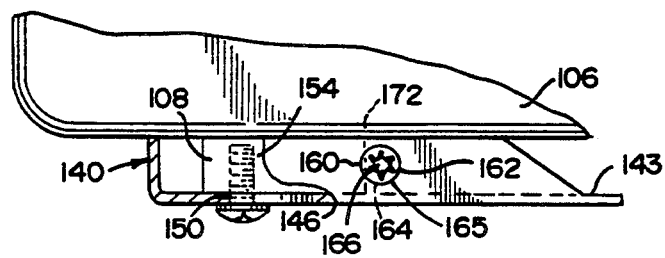
FIG. 2 is partial sectional view of the security mounting assembly of FIG.1 taken along line 2—2 thereof.

A security mounting assembly 100 constructed in accordance with the principles of the present invention is illustrated in FIGS. 1-4. The mounting assembly 100 is used to securely fasten an expensive appliance, such as the illustrated television 102, to a support surface 200. Although the appliance is described and illustrated throughout this detailed description as a television, it will be understood that the present invention works equally well and efficiently on the securement of other expensive appliances, such as computer processing units, video recorders and the like.

The television 102 is of a conventional construction in that it contains a video display or picture tube 103 housed within an exterior housing or cabinet 106 which substantially surrounds the tube 103 and other electronic components associated therewith. The cabinet 106 is preferably provided with a series of members shown as feet or bosses 108, which may be integrally formed within the cabinet 106, such as by injection molding. Each of the feet 108 preferably depends downwardly from the bottom 109 of the television cabinet 106 as shown, and each foot 108 further provides a point of engagement to the mounting assembly 100 by a series of fasteners.

The mounting assembly 100 comprises two elements 120 and 140 which are respectively attached to the support surface 200 and the television 102. The first, or lower element 120, is shown as a circular mounting plate 122. The mounting plate 122 has one or more apertures 124 extending therethrough which permit the passage of mounting hardware such as mounting screws 123 so as to secure the mounting plate to the support surface 200. The mounting assembly upper element 140 is preferably attached to its lower element 120 in a rotatable manner, such as by the bushing member 141 shown centered within a raised portion 146 of the mounting plate 122 which bears against the underside of the upper element 142. Other rotatable attachment means such as a nut and bolt arrangement, may be utilized so long as the two elements may rotate relative to one another without being easily separable from one another. The mounting plate 122 is illustrated as having a circular upstanding ridge portion 126 upon which the upper element 140 rests. The ridge portion 126 also includes a means for limiting the rotation of the two elements in the form of a tab member 128, the purpose of which shall be explained subsequently.

As seen in FIG. 1, some, but not all of the mounting plate apertures 124 may include slot portions 125 which are dimensioned to receive the shafts 126 of the mounting screws 123 which slot portions 125 permit the mounting plate 122 to tolerate some misalignment of the mounting screws 123 with their mounting holes in the support surface 200 and further permit the mounting plate 122 to be adjusted into a final position after initial installation of the mounting plate 122 onto the support surface 200. In order to maintain the mounting plate 122 (and hence the mounting assembly 100 and television 102) in a secure position on its support surface 200, at least one of the mounting screw apertures 124a does not have a slot portion 125 so that the mounting plate 122 may not be moved relative to the remaining mounting screws 123 to remove the mounting plate 122 from the support surface 200. The second element 140 also may include one or more access passages 147 formed near the centerline which permit one to have access to the mounting screws 123 during installation of the mounting assembly.

Turning now to FIGS. 1 and 4, the second element 140 of the mounting assembly 100 includes a generally flat, or planar, tray 142 which serves as a base or support tray for the television 102. The particular configuration of the tray 142 will depend on the identity and nature of the television 102, and does not per se form a part of the invention. As shown in the Figures, the rear portion of the tray 142 is tapered to match the configuration of the television 102. The tray 142 has a flat mounting surface portion 143 which receives the television 102 and particularly, the feet or bosses 108 thereon. A flange 144 extends upwardly from the mounting surface 143 and further extends along at least a portion of the perimeter of the tray 142. The flange 144 preferably contains one or more skirt flanges 146 which are angularly offset from the flange 144. The skirt flanges preferably have a sufficient height to substantially cover the spacing which may exist between the television cabinet 106 and the tray 142 to prevent access by a prying member, such as a crowbar, into the same.

The mounting assembly includes an arrangement of first and second fasteners similar to that described in my copending patent application Ser. No. 760,098, filed Sep. 16, 1991. In this regard, as best seen in FIG. 4, in order to assist in properly positioning the appliance 102 on the mounting surface 143 of the tray 142, the tray 142 includes one or more first and second apertures 150, 160, respectively. These apertures 150 and 160 generally are correspondingly aligned with comparable first and second fastening holes 170, 172 formed in the television 102 (shown in FIGS. 1 and 2 as located in the television cabinet feet 108). A first set of fasteners comprising either conventional or tamper-proof style security fasteners, such as screws 152, may be inserted into the television housing fastening holes 170 formed in the bosses 108 thereof. The first fasteners 152 are tightened until a short extent of the first fastener shafts 154 are exposed. The television 102 is placed upon the tray 142 so that the first fasteners 152 are in alignment with the tray first apertures 150 and pass through the corresponding first apertures 150 of the tray 142. The television 102 is subsequently slid forward on the tray 142 such that the fastener shafts 154 enter and engage the corresponding slot portions 155 of each fastener aperture 150.

At this point, the front edges of the television housing feet 108 are preferably brought into contact with the tray flange 144 such that the flange 144 (and skirt flanges 146) and the television cabinet 106 or feet 108 preferably abut each other. At this point, the first fasteners 152 and the first aperture slot portions 154 cooperate to retain the television cabinet 106 in place upon tray 142 and restrict vertical movement of the television 102 away from the tray mounting surface 143.

As previously mentioned, the television 102 preferably also includes a second set of fastening holes 172 located in either the feet 108 or cabinet portion 106 of the television 102. These second fastening holes 172 are angularly disposed with respect to the support tray second apertures 160 when the first fasteners 152 are engaged in the support tray first aperture slot 155 portions 154. When so aligned, the television 102 is secured to the support tray 142 by a second set of fasteners 162. The second fasteners 162 preferably take the form of special tamper-proof security screws 164 which are of a type not operable with anything but a special tool. In this regard, the screws 164 are equipped with screw heads 165 having a specially configured slot 166 which cannot be engaged by conventional tools such as blade, Phillips-head or Allen-head screwdrivers. The second fasteners 162 and skirt flanges 146 cooperate to maintain the television 102 in place upon the support tray 142 and to prevent any lateral movement of the television 102 on the same so that the first fasteners 152 cannot be disengaged from the support tray 142.

The mounting assembly 100 may also include means for restricting the rotation of the upper element 140 relative to the lower element 120. This restriction means includes the tab member 128 which extends out from the mounting plate ridge portion 126 and one or more stop members 148 which extend through a series of stop slots 149 formed in the tray 142. These elements are best illustrated in FIGS. 3 and 4, wherein the stop slots 149 are arranged in a semi-circular pattern. To limit the extent of rotation of the television and tray 142, the installer places two stop members 148 in the slots 149 at the desired angular rotation. After installation, the tray and television can be rotated to the point where the stop members 148 contact the tab member 128 to limit the rotation thereof. The slots 149 may be arranged in a predesired angular spacing, such as for example, every 30° to provide the end user with a variety of rotation limits.

It will be appreciated that the embodiments of the present invention that have been discussed herein are merely illustrative of a few applications of the principles of the present invention. Numerous modifications may be made by those skilled in the art without departing from the true spirit and scope of the invention.

What is claimed is:

1. A mounting assembly for securely mounting an electrical appliance to a support surface, the mounting assembly comprising:
   a lower section adapted to mate with the support surface, the lower section having at least one mounting aperture extending therethrough to permit the passage of a fastening means for fastening said lower section to said support surface;
   an upper section rotatably joined to said lower section, the upper section including a tray dimensioned to receive the appliance thereon, the upper section further including a flange member extending along a portion of an edge of the tray, said tray and said flange member cooperating to define two distinct areas of engagement between said upper section and said appliance, said tray including at least one opening which permits access to the lower section fastening means, said upper section further including a plurality of first and second apertures, the upper section first apertures being disposed in said tray and the upper section second apertures being disposed in said flange member, said upper section second apertures being further angularly offset from said first apertures, said flange member being adapted to engage a portion of said appliance,
   and said mounting assembly further including upper section first fastening means for providing a first point of engagement between said appliance and said mounting assembly, the first fastening means being adapted to pass generally vertical through said first apertures in said trak and engage said appliance in a manner whereby limited lateral and vertical movement of said appliance relative to said upper section is possible, and upper section second fastening means for providing a second point of engagement between said appliance and said mounting assembly, the second fastening means being adapted to pass generally horizontally through said second apertures of said upper section flange member and engage said appliance in a manner whereby movement of said appliance relative to said upper section is prevented and whereby, when said first and second fastening means engage said appliance through said respective first and second apertures, said second fastening means prevents lateral and vertical movement of said appliance upon said mounting assembly and said first fastening means prevents vertical movement of said appliance upon said mounting assembly.

2. The mounting assembly of claim 1, wherein said second fastening means includes a security screw.

3. The mounting assembly of claim 1, wherein said flange member extends along portions of at least three distinct edges of said tray forming two opposing flange ends, said second apertures being spaced apart from each other and disposed at said opposing ends of said flange member and said second fastening means include two security screws.

4. The mounting assembly of claim 1, wherein said flange member is at least partially disposed along a front and side edge of said upper section.

5. The mounting assembly of claim 1, wherein said flange member is disposed at least partially along a front edge of said support surface and includes at least one skirt flange portion extending generally perpendicularly to said flange member.

6. The mounting assembly of claim 5, wherein said first fastening means engage said appliance in a generally vertical orientation from underneath said tray and through said first apertures and said second fastening means engage said appliance in a generally horizontal orientation from said skirt flange portions and through said second apertures.

7. The mounting assembly of claim 1, wherein said upper section includes two skirt flange portions extending generally perpendicularly to said flange member.

8. The mounting assembly of claim 1, wherein said upper section has at least one opening therein which permits access to said lower section fastening means.

9. The mounting assembly of claim 1, wherein said upper section includes means for restricting the rotation of said upper section relative to said lower section, the rotation restriction means extending through said upper section and engaging a portion of said lower section.

10. A mounting assembly for a television having an exterior housing portion, the mounting assembly comprising, in combination;
a base member for securing the television to a surface, the base member having a plurality of apertures therein which are adapted to receive a corresponding plurality of fastening members extending through the base member apertures to secure said base member to the surface,
a tray member rotatably connected to said base member, the tray member having a plurality of apertures disposed in a support surface thereof in proximity to said base member apertures, wherein access can be had to said base fastening members when positioned in said base member apertures, said tray member support surface further having a series of first openings disposed therein in a preselected pattern, each of said support surface first openings having a non-circular configuration comprising an opening portion and a slot portion in communication with said opening portion, the slot portion being narrower than said opening portion, each of said support surface first openings being adapted to receive a first fastener element therethrough, said slot portion of said first opening permitting lateral movement of the first fastener element from said opening portion to said slot portion while preventing vertical movement of said first fastener element completely through said slot portion, whereby when said first fastener elements are placed in engagement through said first openings into said television, limited lateral movement of said television upon said tray member is permitted, while vertical movement of said television relative to said tray member is substantially prevented,
said tray member including a flange member extending away from said support surface, said tray member supporting surface further including at least one second opening disposed in the flange member such that it opposes a vertical surface of said television exterior housing portion, the second opening being adapted to permit a second fastener element to pass therethrough into said television exterior housing portion vertical surface, whereby said second fastener element prevents lateral and vertical movement of said television upon said tray member support surface, and
means for selectively restricting the degree of rotation of said tray member relative to said base member.

11. A mounting assembly for an appliance having an exterior housing portion, the housing portion having at least one horizontal and vertical surface, the mounting assembly comprising, in combination;
a base member for securing said appliance housing to a surface, the base member having a plurality of apertures therein which are adapted to receive a corresponding plurality of fastening members extending through the base member apertures to secure said base member to the surface,
a tray member rotatably connected to said base member, the tray member having a support surface which opposes said appliance housing horizontal surface, the support surface having a series of first openings disposed therein in a preselected pattern generally opposing said appliance housing horizontal surface, the tray member support surface first openings being adapted to receive a plurality of first television fastening elements therethrough to mount said appliance upon said tray member, each of said support surface first openings having an opening portion and a slot portion in communication with said opening portion, the slot portion being narrower than said opening portion to thereby permit lateral movement of said appliance housing upon said tray member, while restricting vertical movement of said appliance housing upon said tray member said tray member including at least one aperture which permits access to at least one of the fastening members,
said tray member including a flange member extending away from said tray member support surface, the flange member opposing said appliance housing vertical surface, said flange member having at least one second opening disposed in the flange member and opposing said appliance housing vertical surface, the second opening being adapted to permit a second fastener element to pass therethrough into said appliance housing vertical surface to lock said appliance into place upon said tray member, whereby said second fastener element substantially prevents lateral and vertical movement of said appliance upon said tray member support surface.

12. The mounting assembly of claim 11, wherein said second fastener elements include security style fastening screws.

13. The mounting assembly of claim 11, wherein said flange member includes a front portion and two skirt portions extending generally angularly from said front portion, said at least one second opening being disposed in said skirt portions.

14. The mounting assembly of claim 11, further including means for selectively restricting the degree of rotation of said tray member relative to said base member.

15. The mounting assembly of claim 14, wherein said rotation restriction means includes a tab member extending from said base member and one or more stop members which protrudes from said tray member into the path of said base member tab member.

16. The mounting assembly of claim 15, wherein said rotation restriction means includes a stop member protruding from said support surface.

17. The mounting assembly of claim 11, wherein said tray member includes a plurality of apertures disposed in a support surface thereof in proximity to said base member apertures, whereby access can be had to said base member fastening members when positioned in said base member apertures.

* * * * *